Dec. 13, 1949    J. E. PRICE ET AL    2,491,208
GRUBBER
Filed Dec. 14, 1945    2 Sheets-Sheet 1
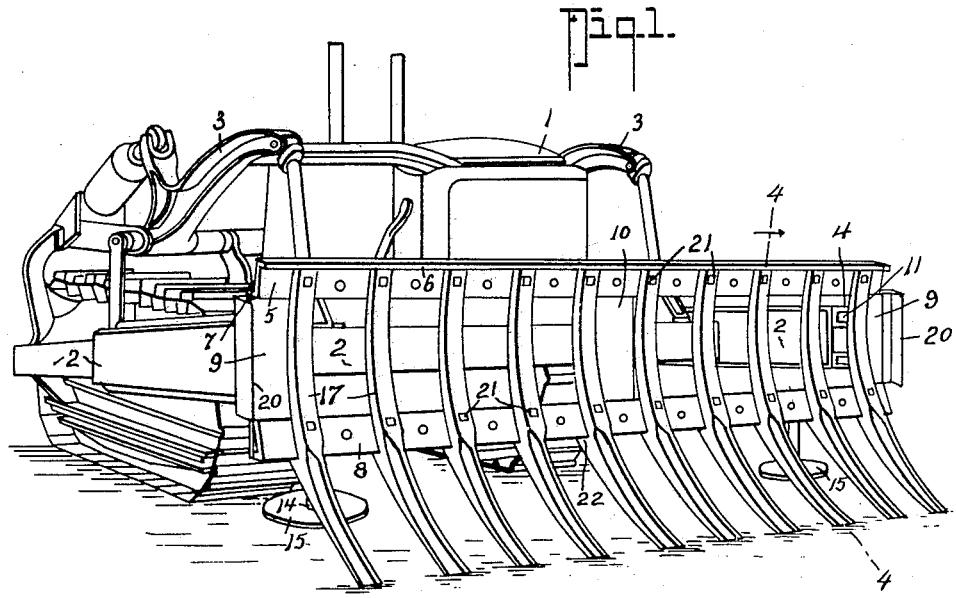
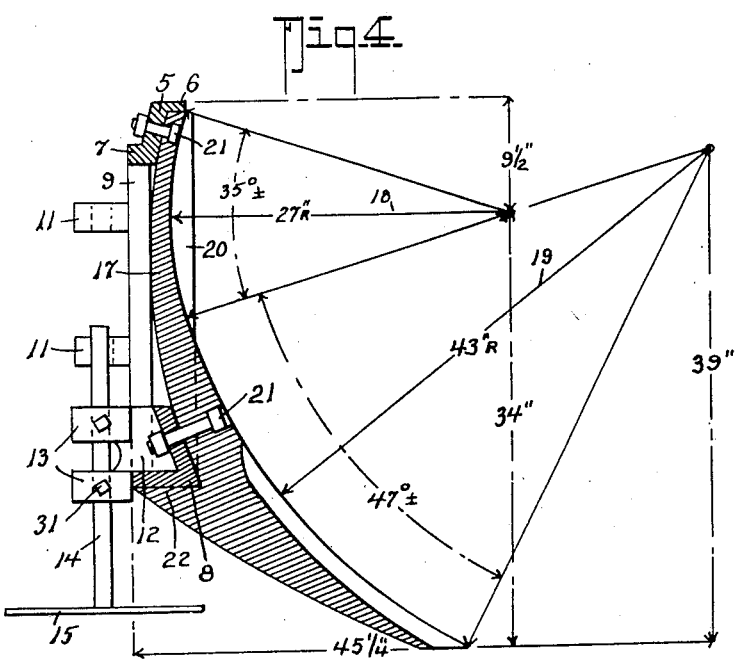
INVENTOR
John E. Price,
Thomas W. Peacock,
BY Albert E. Dieterich
ATTORNEY.

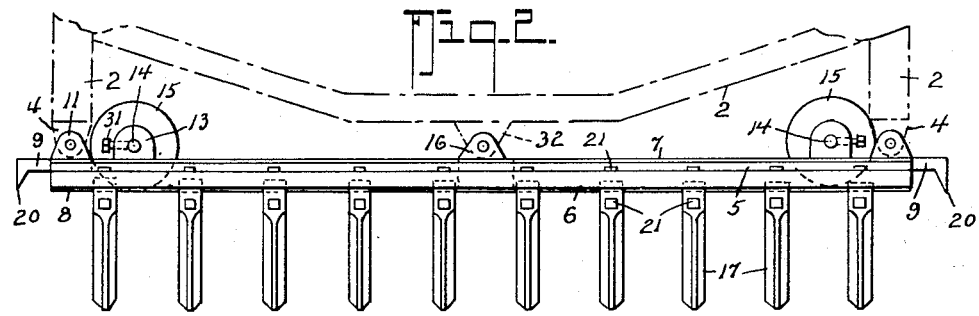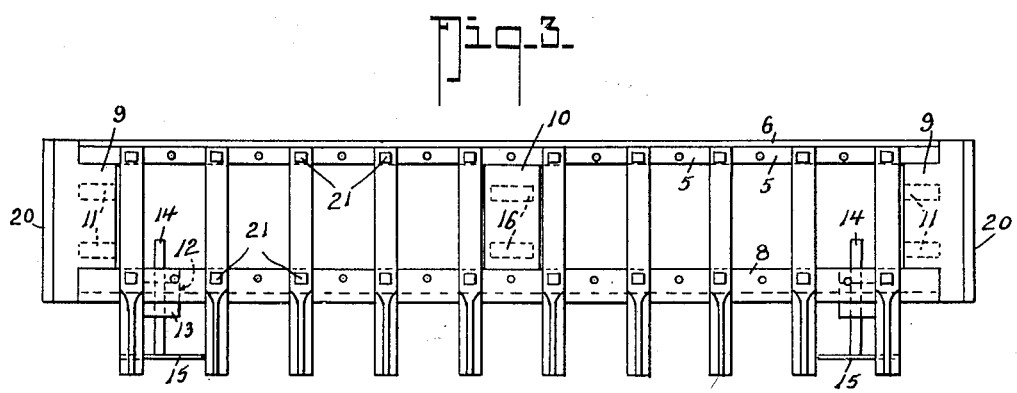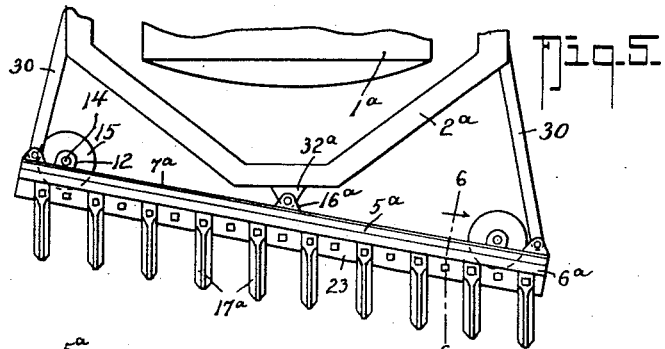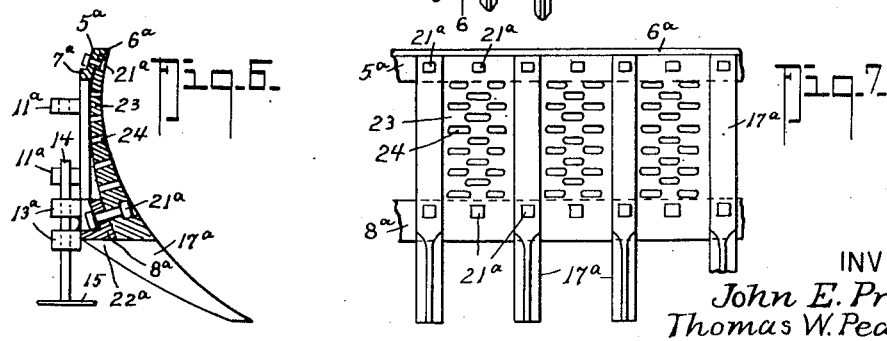

Patented Dec. 13, 1949

2,491,208

UNITED STATES PATENT OFFICE 2,491,208

GRUBBER

John E. Price and Thomas W. Peacock, Jacksonville, Fla., assignors, by direct and mesne assignments, to Florida Land Clearing Equipment Company, a corporation of Florida Application December 14, 1945, Serial No. 634,967

7 Claims. (Cl. 37—2)

1

The invention has for its objects:

1. To provide means whereby the worthless vegetation and trees may be removed, roots and all, and placed in a pile to be burned or be hauled away.

2. To provide a unit comprising a frame, having rake type teeth fastened to the frame, and having large openings for loose sand to fall through, thus leaving a minimum of sand on the roots and brush removed.

3. To provide a frame whose top bar is made to cover the upper ends of the teeth, thus permitting large trees to slide along the top and lay lengthwise of the unit, thus facilitating removal.

4. To provide a unit having a frame whose top and bottom bars and vertical plates are welded together into a unitary structure.

5. To provide a unit which is so made that it will fit standard types of tractor frames, both hydraulic and cable operated; a unit that is interchangeable with the bulldozer and angle-dozer blades.

6. To provide a unit whose rake-type teeth are curved on two radii, a short radius and a long radius, the curve at the upper part of the teeth being that of the shorter radius, which causes the removed vegetation, etc. to roll in a ball, thus facilitating piling.

7. To provide a unit the spacing between whose teeth can be changed to meet local conditions. (With a unit of the dimensions indicated in Fig. 4, a spacing of the teeth 13 inches between centers is usually the correct spacing.)

8. To provide a frame whose end plates are made to extend beyond the sides of the end teeth and be formed with a forwardly projecting knife edge to facilitate the loosening of the roots of large trees and cabbage palms by pushing against the trunks so that, after the roots have been loosened, the rake can be pushed under the roots and the trees or cabbage palms taken out.

9. To provide a unit of the character stated which includes a slide or slides secured to the frame to lie back of the lower parts of the teeth and is made adjustable.

10. To provide a grubber unit of the same principle so designed that it can be used with a track-type tractor, the unit being pushed at an angle to the direction of travel of the tractor; and to provide filler plates between the teeth and extending from lower to upper frame bar thus providing a smooth surface for the brush and trash to slide along sidewise, and fall off the unit and make a continuous pile of trash along

2 the side of the machine, the filler plates being provided with suitable perforations to allow the sand to filter through the same.

Other objects will in part be obvious and in part be pointed out hereinafter.

To the attainment of the aforesaid objects and ends the invention further resides in the novel details of construction, combination and arrangement of parts all of which will be first fully described hereinafter and then be specifically pointed out in the appended claims, reference being had to the accompanying drawings in which:

Fig. 1 is a perspective view of one embodiment of the invention.

Fig. 2 is a top plan view of the unit constituting the essence of the invention.

Fig. 3 is a front elevation of the same.

Fig. 4 is an enlarged detail cross section on the line 4—4 of Fig. 1.

Fig. 5 is a top plan view of another embodiment of the invention on a smaller scale.

Fig. 6 is a detail section on the line 6—6 of Fig. 5.

Fig. 7 is a detail front elevation of a portion of the unit of Figs. 5 and 6.

In the drawings in which like numerals indicate like parts in all the figures, I represents a tractor of well known construction to whose pivoted frame or yoke 2 the present improvement is attached by means of ears 4 on the frame 2 and cooperating ears 11 and 16 on the unit that comprises the essence of the present invention. The usual frame operating (lifting and lowering) mechanism of the tractor 1 is indicated by 3.

The unit of the present invention comprises a rigid, substantially constructed frame composed of a top cross-bar 5, a lower cross-bar 8 and end and intermediate vertical plates or bars 9 and 10 respectively. The parts 5, 8, 9 and 10 are preferably securely welded together into an integral structure or they may be cast integrally or otherwise fabricated if desired.

The top bar 5 has a forwardly extended flange 6 that overlies the upper ends of the teeth 17 and has a base flange 7 to which the plates 9 and 10 are welded.

Brackets 12 having apertured lugs 13 are bolted, welded or otherwise suitably secured to the lower bar 8 and adjustably carry rods 14 to the lower ends of which slides 15 are rigidly secured and adjustably held at the required elevation from the points of the teeth 17, by set screws 31, or in any other suitable way.

The teeth 17 are of the rake type and their front faces are curved on two radii, 18 and 19, the shorter radius 18 being at the upper part of the teeth and the longer radius at the lower part of the same. As shown in Fig. 4 the curve of the shorter radius extends from the top of a tooth about one third, more or less, downwardly where it merges with the curve having the longer radius which latter curve extends to the bottom of the tooth. The dimensions and curvatures given in Fig. 4 can be varied somewhat without departing from the invention pointed out in the appended claims.

The side or end bars 9 are extended beyond the side teeth and have forwardly projecting knife edges 20 for engaging trees, etc., to loosen the roots.

The teeth 17 are bolted to the bars 5 and 8 as at 21 and have rear extensions or heel portions 22 to lie beneath the lower bar 8. The cross-section angle of the lower bar is such that the force of resistance met with by the teeth tends to more securely hold the teeth against the bar 8.

In the second embodiment of the invention (Figs. 5, 6 and 7) those parts which are analogous to parts in the preceding figures bear the same reference numerals plus the index letter a, so they need not again be described herein. In this embodiment the unit frame is mounted at an angle to the line of travel of the tractor while the teeth are mounted on the frame parallel to the said line of travel and the spaces between the teeth and upper and lower bars are closed by filler plates or castings 23 having sand-passing openings 24.

Arms 30 extend from the tractor pivoted frame 2ᵃ to the ears 11ᵃ to which the arms are pinned as indicated. The frame 2ᵃ also has center ears 32ᵃ pinned to the ears 16, similarly to the ears 32 (Fig. 2) in the first embodiment above described.

In practice, the operator lowers the toothed unit and goes forward, raising and lowering the rake-teeth as necessary, pushing the teeth from 0 to 10 inches below the surface of the ground so as to get out all the roots. The roots and vegetation, as the machine moves forward, ball up in front of the rake and the sand sifts back through the openings between the teeth. After going about 100 to 150 feet, the material is left in a pile and another strip started. When the material has dried, it is burned and the ground levelled with a small harrow or other suitable means.

With the machine of the second embodiment of the invention the roots and brush, etc., is discharged to one side of the machine, as the machine moves forward, and thus makes a continuous pile of the material.

The machine, it will be noticed, does not cut the roots but pulls them up entirely.

From the foregoing description taken with the accompanying drawings it is thought the construction, operation and advantages of the present invention will be clear to those skilled in the art and I desire it understood that changes in the details of construction can be made within the spirit of the invention and the scope of the appended claims.

What is claimed is:

1. In a machine of the character described wherein a tractor has a pusher yoke and means for raising and lowering the front portion thereof, the improvement which comprises: a grubber unit that includes a frame having top and bottom cross bars connected by vertical plates, means for mounting said frame on the front portion of the tractor yoke, a set of curved rake teeth secured to the top cross bar, said top cross bar having an edge overlying the upper ends of said teeth.

2. In a machine of the character described wherein a tractor has a pusher yoke and means for raising and lowering the front portion thereof, the improvement which comprises: a grubber unit that includes a frame having top and bottom cross bars connected by vertical plates, means for mounting said frame on the front portion of the tractor yoke, a set of curved rake teeth secured to the front faces of said top and bottom cross bars and having heel portions extended under and engaging the under face of said bottom cross bar, the top cross bar having an edge overlying the upper ends of said teeth.

3. In a machine of the character described wherein a tractor has a pusher yoke and means for raising and lowering the front portion thereof, the improvement which comprises: a grubber unit that includes a frame having top and bottom cross bars connected by vertical plates, means for mounting said frame on the front portion of the tractor yoke, a set of curved rake teeth secured to said top and bottom cross bars and extending a substantial distance below said frame, and filler plates located between adjacent teeth and secured to said frame, said filler plates having openings for the passage of sand and the like.

4. In a machine of the character described wherein a tractor has a pusher yoke and means for raising and lowering the front portion thereof, the improvement which comprises: a grubber unit that includes a frame having top and bottom cross bars connected by vertical plates, means for mounting said frame on the front portion of the tractor yoke, a set of curved rake teeth secured to said top and bottom cross bars and extending a substantial distance below said frame, and filler plates located between adjacent teeth and secured to said frame, said filler plates having openings for the passage of sand and the like, said frame being mounted at an angle to the line of travel of the machine and said teeth lying in vertical planes parallel to the line of travel of the machine.

5. In a machine of the character described wherein a tractor has a pusher yoke and means for raising and lowering the front portion thereof, the improvement which comprises: a grubber unit that includes a frame having top and bottom cross bars connected by vertical plates, means for mounting said frame on the front portion of the tractor yoke, a set of curved rake teeth secured to said top and bottom cross bars and extending a substantial distance below said frame, and filler plates located between adjacent teeth and secured to said frame, said filler plates having openings for the passage of sand and the like, said frame being mounted at an angle to the line of travel of the machine and said teeth lying in vertical planes parallel to the line of travel of the machine, each of said teeth having a front face of two curvatures, one curve extending downwardly from the upper end of the tooth and the other curve extending upwardly from the lower end of the tooth and merging with the upper curve, the upper curve being of a substantially shorter radius than that of the lower curve, for purposes described.

6. In a machine of the character described wherein a tractor has a pusher yoke and means for raising and lowering the front portion thereof, the improvement which comprises: a grubber unit that includes a frame having top and bottom cross bars connected by vertical plates, means for mounting said frame on the front portion of the tractor yoke, a set of curved rake teeth secured to said top and bottom cross bars and extending a substantial distance below said frame, and filler plates located between adjacent teeth and secured to said frame, said filler plates having openings for the passage of sand and the like, said frame being mounted at an angle to the line of travel of the machine and said teeth lying in vertical planes parallel to the line of travel of the machine, each of said teeth having a front face of two curvatures, one curve extending downwardly from the upper end of the tooth and the other curve extending upwardly from the lower end of the tooth and merging with the upper curve, the upper curve being of a substantially shorter radius than that of the lower curve, the upper cross bar having a portion lying over the top ends of said teeth for purposes described.

7. In a machine of the character described wherein a tractor has a pusher yoke and means for raising and lowering the front portion of the same, the improvement which comprises: a grubber that includes a frame having top and bottom cross bars connected by vertical plates, means for mounting said frame on the front portion of the tractor yoke, rake teeth secured to said top cross bar, each tooth having a heel to lie under and in contact with the bottom face of the lower cross bar while the tooth proper lies against the front face of the lower cross bar, a bolt passing through apertures in the tooth and lower cross bar and a nut on said bolt for securing the tooth to the lower cross bar.

JOHN E. PRICE.
THOMAS W. PEACOCK.

REFERENCES CITED

The following references are of record in the file of this patent:

UNITED STATES PATENTS

| Number | Name | Date |
| --- | --- | --- |
| 636,878 | Whipple | Nov. 14, 1899 |
| 1,397,751 | Allington | Nov. 22, 1921 |
| 2,187,707 | Kane | Jan. 16, 1940 |
| 2,304,282 | Ross | Dec. 8, 1942 |
| 2,344,584 | Austin | Mar. 21, 1944 |
| 2,371,549 | Sembler et al. | Mar. 13, 1945 |
| 2,384,957 | Murphy | Sept. 18, 1945 |